(12) United States Patent
Rosenbaum et al.

(10) Patent No.: US 9,251,708 B2
(45) Date of Patent: Feb. 2, 2016

(54) FORWARD COLLISION WARNING TRAP AND PEDESTRIAN ADVANCED WARNING SYSTEM

(75) Inventors: Dan Rosenbaum, Jerusalem (IL); Amiad Gurman, Elkana (IL); Gideon Stein, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 255 days.

(21) Appl. No.: 13/313,227

(22) Filed: Dec. 7, 2011

(65) Prior Publication Data

US 2012/0140076 A1     Jun. 7, 2012

Related U.S. Application Data

(60) Provisional application No. 61/420,405, filed on Dec. 7, 2010, provisional application No. 61/479,485, filed on Apr. 27, 2011.

(51) Int. Cl.
*H04N 7/18* (2006.01)
*G08G 1/16* (2006.01)
*G06K 9/00* (2006.01)

(52) U.S. Cl.
CPC ............ *G08G 1/166* (2013.01); *G06K 9/00805* (2013.01); *G08G 1/165* (2013.01)

(58) Field of Classification Search
CPC ............... G08G 1/16; G08G 3/02; B62D 1/00
See application file for complete search history.

(56) References Cited

U.S. PATENT DOCUMENTS

| | | | |
|---|---|---|---|
| 4,257,703 A | 3/1981 | Goodrich | |
| 4,931,937 A | 6/1990 | Kakinami et al. | |
| 4,969,036 A | 11/1990 | Bhanu | |
| 5,010,457 A | 4/1991 | Ohmamyuda et al. | |
| 5,259,040 A | 11/1993 | Hanna | |
| 5,502,432 A | 3/1996 | Ohmamyuda et al. | |
| 5,529,138 A | 6/1996 | Shaw et al. | |

(Continued)

FOREIGN PATENT DOCUMENTS

EP     0465375 A2     1/1992
EP     1 741 079 B1   5/2008

(Continued)

OTHER PUBLICATIONS

WO 2005/098782 A1, Shashua et al, Collision Warning System, Oct. 20, 2005.*

(Continued)

*Primary Examiner* — Sat V Perungavoor
*Assistant Examiner* — Janese Duley
(74) *Attorney, Agent, or Firm* — The Law Office of Michael E. Kondoudis

(57) ABSTRACT

A method for providing a forward collision warning using a camera mountable in a motor vehicle. The method acquires multiple image frames at known time intervals. A patch may be selected in at least one of the image frames. Optical flow may be tracked between the image frames of multiple image points of the patch. Based on the fit of the image points to a model, a time-to collision (TTC) may be determined if a collision is expected. The image points may be fit to a road surface model and a portion of the image points is modeled to be imaged from a road surface. A collision is not expected based on the fir of the image points to the road surface model.

17 Claims, 9 Drawing Sheets

(56) References Cited

U.S. PATENT DOCUMENTS

| | | | |
|---|---|---|---|
| 5,646,612 A * | 7/1997 | Byon | 340/903 |
| 5,867,256 A | 2/1999 | Van Rheeden | |
| 6,246,961 B1 | 6/2001 | Sasaki et al. | |
| 6,317,691 B1 | 11/2001 | Narayan et al. | |
| 6,704,621 B1 | 3/2004 | Stein et al. | |
| 7,113,867 B1 * | 9/2006 | Stein | 701/301 |
| 7,769,498 B2 * | 8/2010 | Isaji et al. | 701/1 |
| 8,082,101 B2 | 12/2011 | Stein et al. | |
| 2004/0022416 A1 * | 2/2004 | Lemelson et al. | 382/104 |
| 2004/0175019 A1 * | 9/2004 | Howard | 382/103 |
| 2008/0055114 A1 * | 3/2008 | Kim et al. | 340/937 |
| 2008/0199050 A1 * | 8/2008 | Koitabashi | 382/107 |
| 2010/0085238 A1 * | 4/2010 | Muller-Frahm et al. | 342/70 |
| 2010/0191391 A1 * | 7/2010 | Zeng | 701/1 |
| 2012/0314071 A1 * | 12/2012 | Rosenbaum et al. | 348/148 |

FOREIGN PATENT DOCUMENTS

| | | | | |
|---|---|---|---|---|
| EP | 1806595 B1 | 4/2009 | | |
| EP | 2249310 A1 | 11/2011 | | |
| IL | WO2005098782 A1 * | 10/2005 | | G08G 1/16 |
| WO | 01/39018 A1 | 5/2001 | | |
| WO | 0139018 A1 | 5/2001 | | |
| WO | 2005098782 A1 | 10/2005 | | |

OTHER PUBLICATIONS

Lee D N et al: "A theory of visual control of braking based on information about time-to-collision" Department of Psychology, University of Edinburgh, Edinburgh, Scotland EHB 9TA, Received Apr. 22, 1976, Perception, 1976, vol. 5, pp. 437-459.

Ito T; Yamada K: "Preceding vehicle and road lanes recognition methods for RCAS using vision system," /Intelligent Vehicles '94 Symposium, Proceedings of the/ , vol., No., pp. 85-90, Oct. 24-26, 1994 doi: 10.1109/IVS.1994.639478.

Schwarzinger M; Zielke T; Noll D; Brauckmann M: Inst. fur Neuroinformatik, Ruhr-Univ. Bochum "Vision-Based Car-Following: Detection, Tracking, and Identification", Intelligent Vehicles '92 Symposium., Proceedings of the/ Issue date: Jun. 29-Jul. 1, 1992, pp. 24-29, Detroit, MI, USA, ISBN: 0-7803-0747-X.

International Preliminary Examination Report issued corresponding International Application PCT/IL2005/000063 dated Jul. 27, 2006.

2004 IEEE Intelligent Vehicles Symposium, University of Parma, Parma, Italy Jun. 1447, 2004, Forward Collision Warning with a Single Camera, Erez Dagan.

Matthews, "Visual Collision Avoidance," Oct. 1994, 51 pages.

Roberts, "Attentive Visual Tracking and Trajectory Estimation for Dynamic Scene Segmentation," Dec. 1994, 212 pages.

European patent Office, Examination Report, Feb. 18, 2014, App No. 11275158.1.

Horn, Berthold K., and Brian G. Schunck. "Determining optical flow." 1981 Technical Symposium East. International Society for Optics and Photonics, 1981.

Irani, Michal, P. Anandan, and Meir Cohen. "Direct recovery of planar-parallax from multiple frames." Pattern Analysis and Machine Intelligence, IEEE Transactions on 24.11 (2002): 1528-1534.

Cipolla, Roberto, and Andrew Blake. "Surface orientation and time to contact from image divergence and deformation." Computer Vision—ECCV'92. Springer Berlin Heidelberg, 1992.

Horn, Berthold KP, Yajun Fang, and Ichiro Masaki. "Time to contact relative to a planar surface." Intelligent Vehicles Symposium, 2007 IEEE. IEEE, 2007.

Dagan, Erez, et al. "Forward collision warning with a single camera." Intelligent Vehicles Symposium, 2004 IEEE. IEEE, 2004.

Bootsma, Reinoud J., and C. Lieke E. Peper. "Predictive visual information sources for the regulation of action with special emphasis on catching and hitting." Advances in psychology 85 (1992): 285-314.

Mano, Gideon P. Stein Ofer, and Amnon Shashua. "A Robust Method for Computing Vehicle Ego-motion." Proceedings of IEEE Intelligent Vehicles Symposium. 2000.

Brauckmann, Michael E., et al. "Towards all around automatic visual obstacle sensing for cars." Intelligent Vehicles' 94 Symposium, Proceedings of the. IEEE, 1994.

Giachetti, Andrea, Marco Campani, and Vincent Torre. "The use of optical flow for road navigation." Robotics and Automation, IEEE Transactions on 14.1 (1998): 34-48.

Meer, Peter. "Robust techniques for computer vision." Emerging topics in computer vision (2004): 107-190.

Schwarzinger, Michael, et al. "Vision-based car-following: detection, tracking, and identification." Intelligent Vehicles' 92 Symposium., Proceedings of the. IEEE, 1992.

Burger, Wilhelm, and Bir Bhanu. "Estimating 3D egomotion from perspective image sequence." Pattern Analysis and Machine Intelligence, IEEE Transactions on 12.11 (1990): 1040-1058.

European Patent Office, European Search Opinion & SearchReport issued in European Application No. EP06124013.1, Apr. 11, 2007, 5 pages.

United States Patent and Trademark Office, Paper No. 17, Date: Aug. 27, 2013, Decision Institution of Inter Partes Review 37 C.F.R. § 42.108.

United States District Court Southern District of New York, Opinion and Order, Jed S. Rakoff, U.S.D.J., Opinion and Order dated Mar. 5, 2013,47 pages, filed in *Mobileye, Inc.* v. *Picitup Corp.*, 1:12-cv-01994 (JSR), S.D.N.Y.

Sahli, Hichem, Patrick De Muynck, and Jan Cornelis. "A Kalman Filter-Based Update Scheme for Road Following." MVA. 1996.

Suzuki, Toshihiko, and Takeo Kanade. "Measurement of vehicle motion and orientation using optical flow." IEEE/IEEJ/JSAI International Conference on Intelligent Transportation Systems (1999: Tokyo, Japan). Proceedings: 1999 IEEE/IEEJ/JSAI International Conference on Intelligent Transportation Systems. 1999.

Development of a Vision-Based Vehicle Detection and Recognition System for Intelligent Vehicles, BIN RAN, 1999 TRB Annual Meeting Nov. 16, 1998.

Picitup, Inc., Press Release—"iOnRoad Augmented Driving App Too Smart for the iPhone," Oct. 31, 2011.

Shashua et al., File History of U.S. Appl. No. 60/167,587, filed Nov. 26, 1999.

Zielke et al., "Intensity and Edge-Based Symmetry Detection Applied to Car-Following," Lecture Notes in Computer Science, vol. 588, Computer-Vision-ECCV, 1992, 9 pages.

Lee et al., "Visual timing in hitting an accelerating ball," Quart. J. Exp. Psychol., 35A: 333-346 (1983).

Muller et al., "Time to Contact Estimation Using Interest Points," Proc. 12th IEEE Conf., Oct. 2009.

Complaint, dated Mar. 16, 2012, filed in *Mobileye, Inc.* v. *Picitup Corp.*, 1:12-cv-01994 (JSR) S.D.N.Y., 20 pages.

Amendment and Response to Office Action in Reexamination No. 95/002,012, Oct. 9, 2012, 38 pages.

Answer to Amended Complaint, dated Jul. 30, 2012, filed in *Mobileye, Inc.* v. *Picitup Corp.*, 1:12-cv-01994 (JSR), S.D.N.Y., 24 pages.

Mobileye, C2-170 Driver Assistance System User Manual, © 2007-2009.

File History of U.S. Appl. No. 09/723,755, filed in *Mobileye, Inc.* v. *Picitup Corp.*, 1:12-cv-01994 (JSR) S.D.N.Y., 285 pages.

File History of U.S. Appl. No. 10/599,667, filed in *Mobileye, Inc.* v. *Picitup Corp.*, 1:12-cv-01994 (JSR) S.D.N.Y., 251 pages.

Lee, "A theory of visual control of braking based on information about time-to-collision", Perception 5:437-459, 1976.

Screen capture of Picitup YouTube Channel page, http://www.youtube.com/user/PicitupCorp/videos?view=0, captured on Apr. 23, 2014.

Screen capture of "iOnRoad Night Driving," iOn Road YouTube Channel page, http://www.youtube.com/watch? v=uHzu280wM0, captured on Apr. 23, 2014.

Screen capture of "iOnRoad AR collision warning," iOn Road YouTube Channel page, http://www.youtube.com/watch? v=hEKe4wR262I, captured on Apr. 23, 2014.

Screen capture of "iOnRoad car mount installation," iOn Road YouTube Channel page, http://www.youtube.com/watch?v=bZboIrpXUqc, captured on Apr. 23, 2014.

(56) References Cited

OTHER PUBLICATIONS

Screen capture of "iOnRoad: Smarter Phones, Smarter Driving," iOn Road YouTube Channel page, http://www.youtube.com/watch?v=awhfkDzgIsA, captured on Apr. 23, 2014.

Screen capture of "iOnRoad Demo—Israel Mobile Summit," iOn Road YouTube Channel page, http://www.youtube.com/watch?v=v5EBJ3Jw5Cg, captured on Apr. 23, 2014.

Screen capture of "iOnRoad AR collision warning," iOn Road YouTube Channel page, http://www.youtube.com/watch?v=SOXKegvSN5U, captured on Apr. 23, 2014.

Request for Inter Partes Reexamination of U.S. Pat. No. 7,133,867 Pursuant to 37 C.F.R. §1.915, Jun. 6, 2012, 95 pages.

Exhibit 2 to McNamee Declaration, Transaction History for Inter Partes Reexamination of U.S. Pat. No. 7,133,867, Oct. 26, 2012, filed in *Mobileye, Inc.* v. *Picitup Corp.*, 1:12- cv-01994 (JSR) S.D.N.Y., 2 pages.

Exhibit 3 to McNamee Declaration, USPTO Memorandum attaching Interim Guidance for Determining Subject Matter Eligibility for Process Claims in View of *Bilski* v. *Kappos*, Jul. 27, 2010, filed in *Mobileye, Inc.* v. *Picitup Corp.*, 1:12-cv-01994{JSR) S.D.N.Y., 11 pages.

Shashua et al., File History of U.S. Appl. No. 60/230,166, filed Sep. 1, 2000.

Defendant's Answer and Affirmative Defenses, *Mobileye, Inc. et al.* v. *Picitup Corp., et al.*, Case No. 12-cv-1994, United States District Court, Southern District of New York, dated Jun. 11, 2012, 16 pages.

U.S. Certificate of Registration, Registration No. 3,150,324, Oct. 3, 2006, 1 page.

Protective Order, *Mobileye, Inc. et al.* v. *Picitup Corp., et al.*, Case No. 12-cv-1994, United States District Court, Southern District of New York, dated Jun. 14, 2012, 16 pages.

Defendants' Amended Statement of Undisputed Material Facts in Support of Their Motion for Summary Judgment Pursuant to 35 U.S.C. 101—Lack of Patentable Subject Matter, *Mobileye, Inc. et al.* v. *Picitup Corp., et al.*, Case No. 12-cv-1994, United States District Court, Southern District of New York, dated Sep. 19, 2012, 13 pages.

Defendants' Memorandum in Support of Their Motion for Summary Judgment Pursuant to 35 U.S.C. 101—Lack of Patentable Subject Matter, *Mobileye, Inc. et al.* v. *Picitup Corp., et al.*, Case No. 12-cv-1994, United States District Court, Southern District of New York, dated Sep. 19, 2012, 27 pages.

Amended Order Dismissing Request to Take Evidence Abroad, *Mobileye, Inc. et al.* v. *Picitup Corp., et al.*, Case No. 12-cv-1994, United States District Court, Southern District of New York, dated Jun. 19, 2012, 2 pages.

Exhibit 26 to Defendants' Rule 56.1 Statement in Support of Their Motions for Summary Judgment of Non-Infringement and Invalidity of U.S. Pat. No. 6,704,621, U.S. Pat. No. 7,113,867, and U.S. Pat. No. 8,082,101: Transmittal of Communication to Third Party Requester, Inter Partes Reexamination, Order Granted Request, dated Aug. 6, 2012, filed in *Mobileye, Inc. et al.* v. *Picitup Corp., et al.*, Case No. 12-cv-1994, United States District Court, Southern District of New York, 21 pages.

Burlina et al., "Time-to-X: Analysis of Motion through Temporal Parameters," Computer Vision Laboratory Center for Automation Research, University of Maryland, College Park, MD, USA, Jul. 1994, 40 pages.

\* cited by examiner

FORWARD COLLISION WARNING TRAP AND PEDESTRIAN ADVANCED WARNING SYSTEM

CROSS REFERENCE TO RELATED APPLICATIONS

The present application claims priority from U.S. provisional application 61/420,405 filed on Dec. 7, 2010 and 61/479,485 filed Apr. 27, 2011 of the present inventor, the disclosures of which are incorporated herein by reference.

BACKGROUND

1. Technical Field

The present invention relates to a driver assistance system which provides forward collision warning in motor vehicle.

2. Description of Related Art

During the last few years camera based driver assistance systems (DAS) have been entering the market; including lane departure warning (LDW), Automatic High-beam Control (AHC), pedestrian recognition, and forward collision warning (FCW).

Lane departure warning (LDW) systems are designed to give a warning in the case of unintentional lane departure. The warning is given when the vehicle crosses or is about to cross the lane marker. Driver intention is determined based on use of turn signals, change in steering wheel angle, vehicle speed and brake activation.

In image processing, the Moravec corner detection algorithm is probably one of the earliest corner detection algorithms and defines a corner to be a point with low self-similarity. The Moravec algorithm tests each pixel in the image to see if a corner is present, by considering how similar a patch centered on the pixel is to nearby largely overlapping patches. The similarity is measured by taking the sum of squared differences squared differences (SSD) between the two patches. A lower number indicates more similarity. An alternative approach to corner detection in images is based on a method proposed by Harris and Stephens, which is an improvement of the method by Moravec. Harris and Stephens improved upon Moravec's corner detector by considering the differential of the corner score with respect to direction directly, instead of using nearby patches of Moravec.

In computer vision, a widely used differential method for optical flow estimation was developed by Bruce D. Lucas and Takeo Kanade. The Lucas-Kanade method assumes that the flow is essentially constant in a local neighborhood of the pixel under consideration, and solves the basic optical flow equations for all the pixels in that neighborhood, by the least squares criterion. By combining information from several nearby pixels, the Lucas-Kanade method can often resolve the inherent ambiguity of the optical flow equation. It is also less sensitive to image noise than point-wise methods. On the other hand, since it is a purely local method, it cannot provide flow information in the interior of uniform regions of the image.

BRIEF SUMMARY

According to features of the present invention various methods are provided for signaling a forward collision warning using a camera mountable in a motor vehicle. Multiple image frames are acquired at known time intervals. An image patch may be selected in at least one of the image frames. Optical flow may be tracked of multiple image points of the patch between the image frames. The image points may be fit to at least one model. Based on the fit of the image points, it may be determined if a collision is expected and if so a time-to-collision (TTC) may be determined. The image points may be fit to a road surface model and a portion of the image points may be modeled as imaged from a road surface. It may be determined that a collision is not expected based on the fit of the image points to the road surface model. The image points may be fit to a vertical surface model, in which a portion of the image points may be modeled to be imaged from a vertical object. A time to collision TTC may be determined based on the fit of the image points to the vertical surface model. Image points may be fit to a mixed model where a first portion of the image points may be modeled to be imaged from a road surface and a second portion of the image points may be modeled to be imaged from a substantially vertical or upright object not lying in the road surface.

In the image frames, a candidate image of a pedestrian may be detected where the patch is selected to include the candidate image of the pedestrian. The candidate image may be verified as an image of an upright pedestrian and not an object in the road surface when the best fit model is the vertical surface model. In the image frames a vertical line may be detected, where the patch is selected to include the vertical line. The vertical line may be verified as an image of a vertical object and not of an object in the road surface when the best fit model is the vertical surface model.

In the various methods, a warning may be issued based on the time-to-collision being less than a threshold. In the various methods, a relative scale of the patch may be determined based on the optical flow between the image frames and the time-to-collision (TTC) may be determined which is responsive to the relative scale and the time intervals. The method may avoid object recognition in the patch prior to determining the relative scale.

According to features of the present invention a system is provided including a camera and a processor. The system may be operable to provide a forward collision warning using a camera mountable in a motor vehicle. The system may also be operable to acquire multiple image frames at known time intervals, to select a patch in at least one of the image frames; to track optical flow between the image frames of multiple image points of the patch; to fit the image points to at least one model and based on the fit of the image points to the at least one model, to determine if a collision is expected and if so to determine the time-to-collision (TTC). The system may be further operable to fit the image points to a road surface model. It may be determined that a collision is not expected based on the fit of the image points to the road surface model According to other embodiments of the present invention, a patch in an image frame may be selected which may correspond to where the motor vehicle will be in a predetermined time interval. The patch may be monitored; if an object is imaged in the patch then a forward collision warning may be issued. It may be determined if the object is substantially vertical, upright or not in the road surface by tracking optical flow between the image frames of multiple image points of the object in the patch. The image points may be fit to at least one model. A portion of the image points may be modeled to be imaged from the object. Based on the fit of the image points to the at least one model, it may be determined if a collision is expected and if so a time-to-collision (TTC) may be determined. A forward collision warning may be issued when the best fit model includes a vertical surface model. The image points may be fit to a road surface model. It may be determined that a collision is not expected based on the fit of the image points to the road surface model.

According to features of the present invention a system is provided for providing a forward collision warning in a motor vehicle. The system includes a camera and a processor mountable in the motor vehicle. The camera may be operable to acquire multiple image frames at known time intervals. The processor may be operable to select a patch in an image frame corresponding to where the motor vehicle will be in a predetermined time interval and to monitor the patch. If an object is imaged in the patch, a forward collision warning may be issued if the object is found to be upright and/or not in the road surface. The processor may further be operable to track between the image frames, multiple image points of the object in the patch and fit the image points to one or more models. The models may include a verticle object model, a road surface model and/or a mixed model including one or more image points assumed to from the road surface and one or more image points from an upright object not in the road surface. Based on the fit of the image points to the models, it is determined if a collision is expected and if a collision is expected a time to collision (TTC) is determined. The processor may be operable to issue a forward collision warning based on TTC being less than a threshold.

BRIEF DESCRIPTION OF THE DRAWINGS

The invention is herein described, by way of example only, with reference to the accompanying drawings, wherein.

DETAILED DESCRIPTION

Figure 1A:
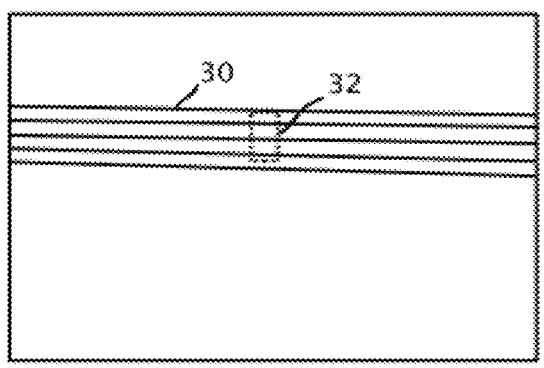
FIGS. 1a and 1b show schematically two images captured from a forward looking camera mounted inside a vehicle as the vehicle approaches a metal fence, according to a feature of the present invention.

Reference will now be made in detail to features of the present invention, examples of which are illustrated in the accompanying drawings, wherein like reference numerals refer to the like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

By way of introduction, embodiments of the present invention are directed to a forward collision (FCW) system. According to U.S. Pat. No. 7,113,867, a image of lead vehicle is recognized. The width of the vehicle may be used to detect a change in scale or relative scale S between image frames and the relative scale is used for determining time to contact. Specifically, for example width of the lead vehicle, have a length (as measured for example in pixels or millimeters) in the first and second images represented by w(t1) and w(t2) respectively. Then, optionally the relative scale is S(t)=w(t2)/w(t1).

According to the teachings of U.S. Pat. No. 7,113,867, the forward collision (FCW) system depends upon recognition of an image of an obstruction or object, e.g. lead vehicle for instance, as recognized in the image frames. In the forward collision warning system, as disclosed in U.S. Pat. No. 7,113,867, the scale change of a dimension, e.g. width, of the detected object e.g. vehicle is used to compute time-to-contact (TTC). However, the object is first detected and segmented from the surrounding scene. This disclosure describes a system which using the relative scale change is based on optical flow to determine the time to collision TTC and likelihood of collision and issue an FCW warning if required. Optical flow causes the looming phenomenon in perception of images which appear larger as objects being imaged get closer. Object detection and/or recognition may be performed or object detection and/or recognition may be avoided, according to different features of the present invention.

The looming phenomenon has been widely studied in biological systems. Looming appears to be a very low level visual attention mechanism in humans and can trigger instinctive reactions. There have been various attempts in computer vision to detect looming and there was even a silicon sensor design for detection of looming in the pure translation case.

Looming detection may be performed in real world environments with changing lighting conditions, complex scenes including multiple objects and host vehicle which includes both translation and rotation.

The term "relative scale" as used herein refers to the relative size increase (or decrease) of an image patch in an image frame and a corresponding image patch in a subsequent image frame.

Figure 9:
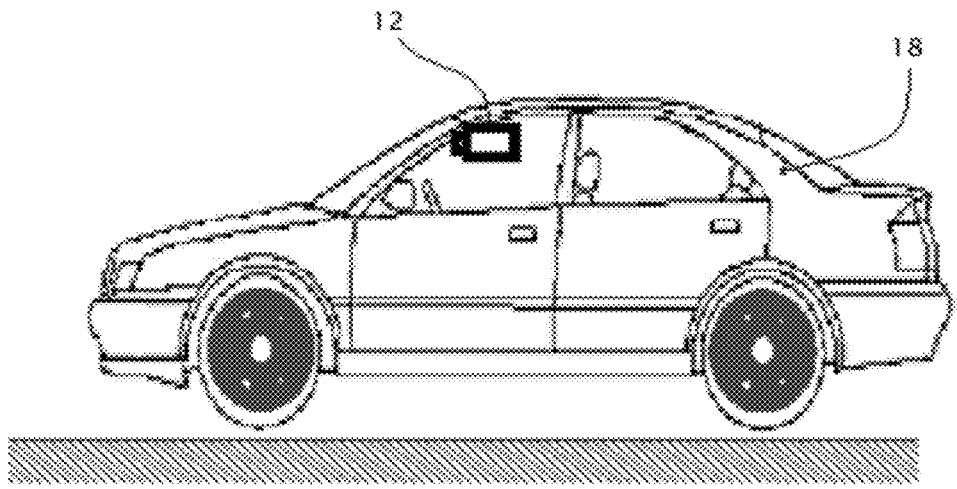
FIGS. 9 and 10 illustrate a system which includes a camera or image sensor mounted in a vehicle, according to an aspect of the present invention.
Figure 10:
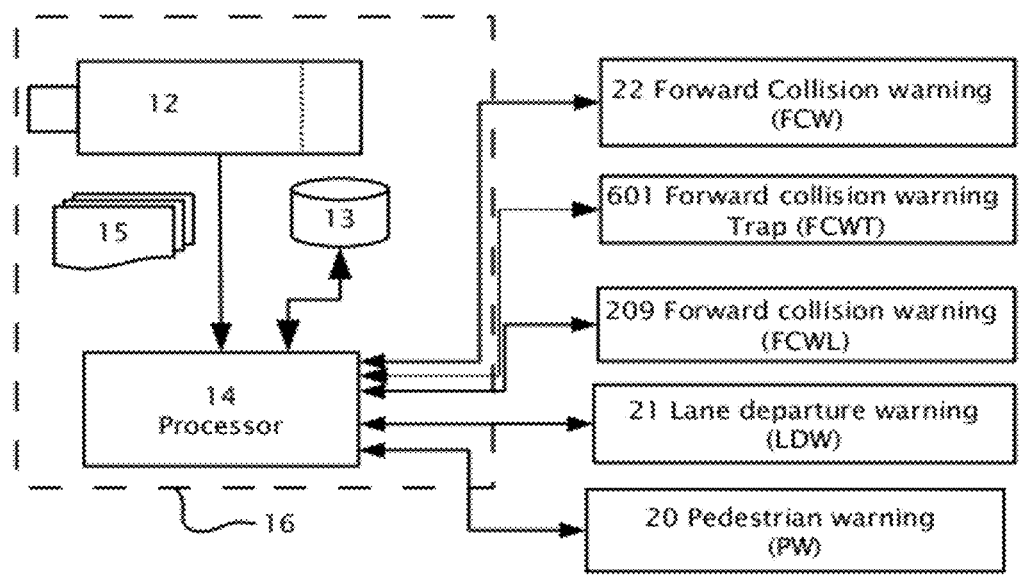

Reference is now made to FIGS. 9 and 10 which illustrate a system 16 including a camera or image sensor 12 mounted in a vehicle 18, according to an aspect of the present invention. Image sensor 12, imaging a field of view in the forward direction delivers images in real time and the images are captured in a time series of image frames 15. An image processor 14 may be used to process image frames 15 simultaneously and/or in parallel to serve a number of driver assistance systems. The driver assistance systems may be implemented using specific hardware circuitry with on board software and/or software control algorithms in storage 13. Image sensor 12 may be monochrome or black-white, i.e. without color separation or image sensor 12 may be color sensitive. By way of example in FIG. 10, image frames 15 are used to serve pedestrian warning (PW) 20, lane departure warning (LDW) 21, forward collision warning (FCW) 22 based on target detection and tracking according to the teachings of U.S. Pat. No. 7,113,867, forward collision warning based on image looming (FCWL) 209 and/or forward collision warning 601 based on an FCW trap (FCWT) 601. Image processor 14 is used to process image frames 15 to detect looming in an image in the forward field of view of camera 12 for forward collision warning 209 based on image looming and FCWT 601. Forward collision warning 209 based on image looming and forward collision warning based on traps (FCWT) 601 may be performed in parallel with conventional FCW 22 and with the other driver assistance functions, pedestrian detection (PW) 20, lane departure warning(LDW) 21, traffic sign detection, and ego motion detection. FCWT 601 may be used to validate the conventional signal from FCW 22. The term "FCW signal" as used herein refers to a forward collision warning signal. The terms "FCW signal", "forward collision warning", and "warning" are used herein interchangeably.

Figure 1B:
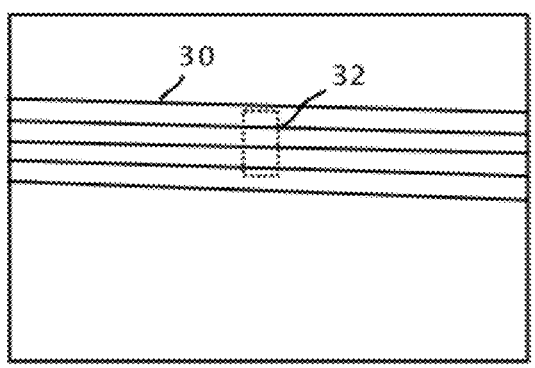

A feature of the present invention is illustrated in FIGS. 1a and 1b which show an example of optical flow or looming. Two images captured are shown from a forward looking camera 12 mounted inside a vehicle 18 as vehicle 18 approaches a metal fence 30. The image in FIG. 1a shows a field and a fence 30. The image in FIG. 1b shows the same features with vehicle 18 closer if a small rectangular p 32 of the fence (marked in dotted line) is viewed it may be possible see that the horizontal lines 34 appear to spread out as vehicle 18 approaches fence 30 in FIG. 1b.

Figure 2A:
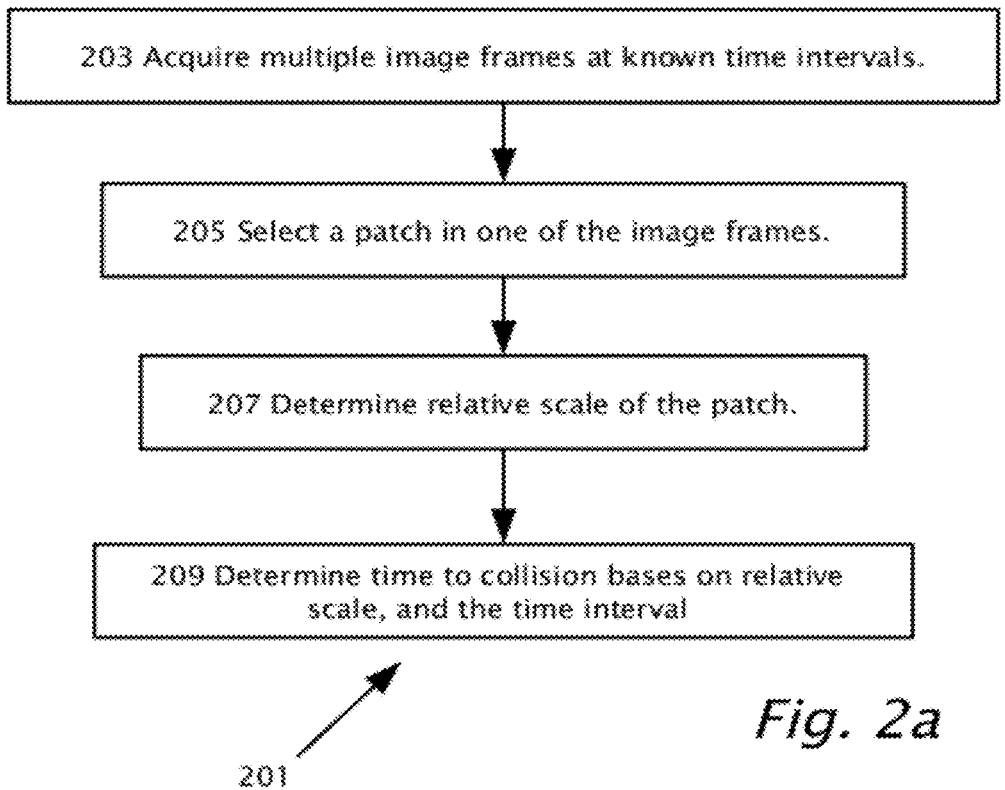
FIG. 2a shows a method for providing a forward collision warning using a camera mounted in host vehicle, according to a feature of the present invention.

Reference is now made to FIG. 2a which shows a method 201 for providing a forward collision warning 209 (FCWL 209) using camera 12 mounted in host vehicle 18, according to a feature of the present invention. Method 201 does not depend on object recognition of an object in the forward view of vehicle 18. In step 203 multiple image frames 15 are acquired by camera 12. The time interval between capture of image frames is $\Delta t$. A patch 32 in image frame 15 is selected in step 205 and a relative scale (S) of patch 32 is determined in step 207. In step 209, the time-to-collision (TTC) is determined based on the relative scale (S) and the time interval ($\Delta t$) between frames 15.

Figure 2B:
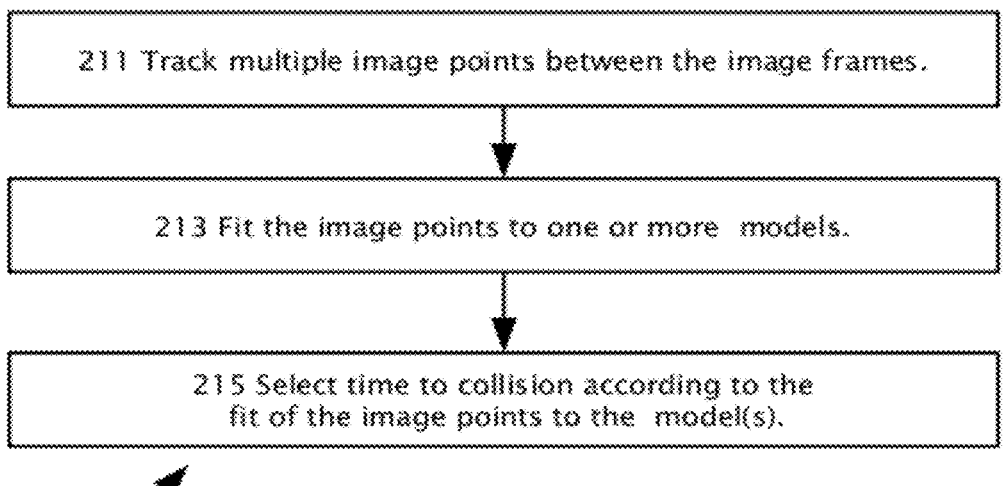
FIG. 2b shows further details of determining time to collision step shown in FIG. 2a, according to a feature of the present invention.

Reference is now made to FIG. 2b which shows further details of determining time to collision step 209 shown in FIG. 2a, according to a feature of the present invention. In step 211 multiple image points in a patch 32 may be tracked between image frames 15. In step 213 the image points of may be fit to one or more models. A first model may be a vertical surface model that may include objects such as a pedestrian, a vehicle, a wall, bushes, trees or a lamp post. A second model may be a road surface model which considers features of image points on the road surface. A mixed model may include one or more image points from the road and one or more image points from an upright object For models which assume at least a portion of the image points of an upright object multiple time-to-collision (TTC) values may be computed. In step 215, the best fit of the image points to a road surface model, a vertical surface model, or a mixed model enables selection of the time-to-collision (TTC) value. A warning may be issued based on the time-to-collision (TTC) being less than a threshold and when the best fit model is the vertical surface model or a mixed model.

Alternatively, step 213 may also include in the image frames 15, the detection of a candidate image. The candidate image may be a pedestrian or a vertical line of a vertical object such as lamppost for example. In either case of a pedestrian or a vertical line, patch 32 may be selected so as to include the candidate image. Once patch 32 has been selected it may then be possible to perform a verification that the candidate image is an image of an upright pedestrian and/or a vertical line. The verification may confirm that the candidate image and is not an object in the road surface when the best fit model is the vertical surface model.

Referring back to FIGS. 1a and 1b, sub-pixel alignment of patch 32 from the first image shown in FIG. 1a to the second image shown in FIG. 1b may produce a size increase or increase in relative scale S by 8% (S=1.08) (step 207). Given the time difference between the images of $\Delta t$=0.5 sec, the time to contact (TTC) can be computed (step 209) using equation 1 below:

$$TTC = \frac{\Delta t}{S-1} = 0.5008 = 6.25 \text{ sec} \tag{1}$$

If vehicle 18 speed v in known ($v_1$=4.8 m/s), the distance Z to the target can also be computed using equation 2 below:

$$Z = \frac{v * \Delta t}{S-1} = \frac{4.8 * 0.5}{1.08 - 1} = 30 \text{ m} \tag{2}$$

Figure 3A:
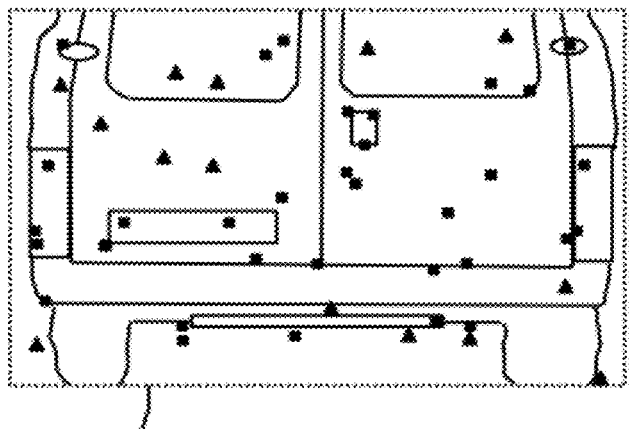
FIG. 3a shows an image frame of an upright surface (the back of a van), according to a feature of the present invention.
Figure 3B:
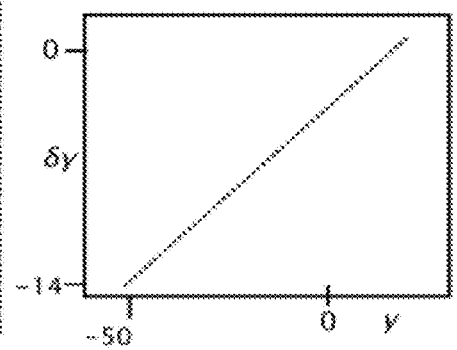
FIG. 3b shows the vertical motion of points δy as a function of vertical image position (y) for FIG. 3a, according to an feature of the present invention.
Figure 3C:
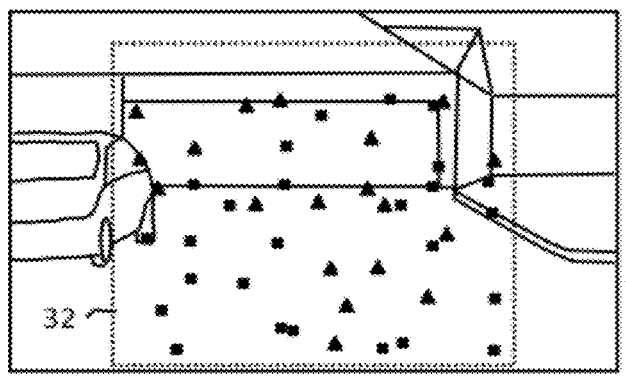
FIG. 3c shows a rectangular region which is primarily of a road surface, according to a feature of the present invention.
Figure 3D:
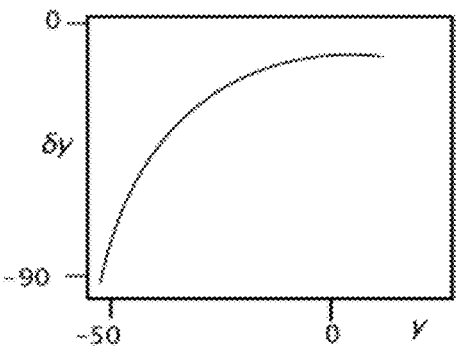
FIG. 3d shows the vertical motion of points δy as a function of vertical image position (y) for FIG. 3c, according to an feature of the present invention.

FIGS. 3b and 3d show the vertical motion of points $\delta y$ as a function of vertical image position (y), according to an feature of the present invention. Vertical motion $\delta y$ is zero at the horizon and negative values are below the horizon. Vertical motion of points $\delta y$ is shown in equation 3 below.

$$\delta y = \frac{\Delta Z(y - y_0)}{Z} \tag{3}$$

Equation (3) is a linear model relating y and $\delta y$ and has effectively two variables. Two points may be used to solve for the two variables.

For vertical surfaces the motion is zero at the horizon ($y_0$) and changes linearly with image position since all the points are at equal distance as in the graph shown in FIG. 3b. For road surfaces, points lower in the image are closer (Z is smaller) as shown in equation 4 below:

$$Z = \frac{fH}{y - y_0} \tag{4}$$

and so the image motion (δy) increases at more than linear rate as shown in equation 5 below and in the graph of FIG. 3d.

$$\delta y = \frac{\Delta Z(y - y0)^2}{fH} \quad (5)$$

Equation (5) is a restricted second order equation with effectively two variables. Again, two points may be used to solve for the two variables.

Reference is now made to FIGS. 3a and 3c which represent different image frames 15. In FIGS. 3a and 3c two rectangular regions are shown by dotted lines. FIG. 3a shows an upright surface (the back of a van). The square points are points that were tracked (step 211) and the motion matches (step 213) the motion model for an upright surface shown in the graph of image motion (δy) versus point height y in FIG. 3b. The motion of the triangular points in FIG. 3a do not match the motion model for an upright surface. Reference is now made to FIG. 3c which shows a rectangular region primarily of a road surface. The square points are points that match a road surface model shown in the graph of image motion (δy) versus point height y in FIG. 3d. The motion of triangular points do not match the motion model for the road surface and are outliers. The task in general therefore is to determine which points belong to the model (and to which model) and which points are outliers which may be performed by a robust fit approach as explained below.

Figure 4A:
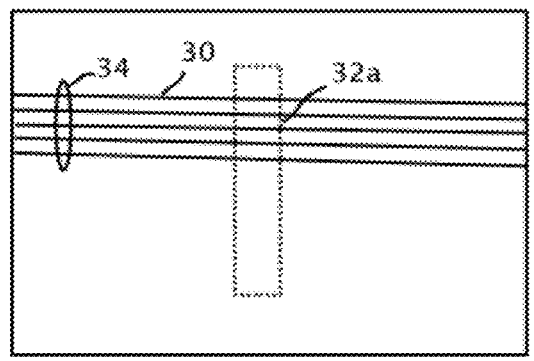
FIG. 4a shows an image frame which includes an image of a metal fence with horizontal lines and a rectangular patch, according to a feature of the present invention.
Figure 4B:
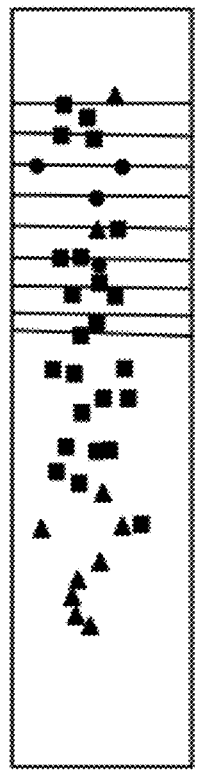
FIGS. 4b and 4c show more details of the rectangular patch shown in FIG. 4a, according to a feature of the present invention.
Figure 4C:
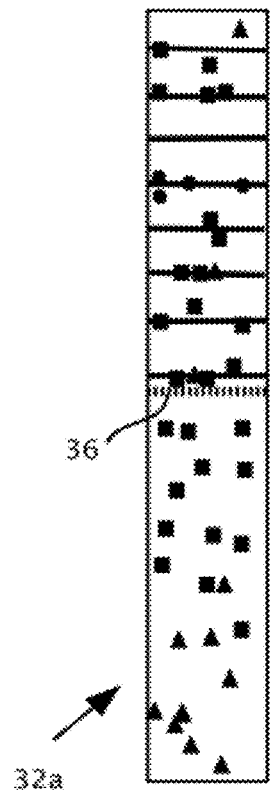
Figure 4D:
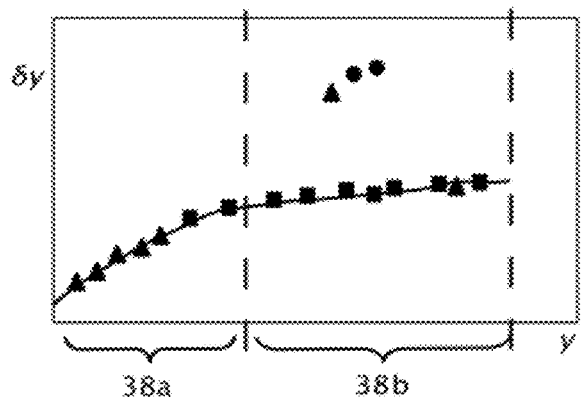
FIG. 4d illustrates a graph of vertical motion of points (δy) versus vertical point position (y), according to a feature of the present invention.

Reference is now made to FIGS. 4a, 4b, 4c and 4d which show a typical scenario of a mixture of two motion models found in an image, according to an feature of the present invention. FIG. 4a shows an image frame 15 including an image of a metal fence 30 with horizontal lines 34 and rectangular patch 32a. Further detail of patch 32a are shown in FIGS. 4b and 4c. FIG. 4b shows detail of patch 32a of a previous image frame 15 and FIG. 4c shows detail 32a in a subsequent image frame 15 when vehicle 18 is closer to fence 30. Image points are shown as squares, triangles and circles in FIGS. 4c and 4d on the upright obstacle 30 and image points are shown on the road surface leading up to the obstacle 30. Tracking points inside the rectangular region 32a show that some points in the lower part of region 32a correspond to a road model and some points in the upper part of region 32a correspond to an upright surface model. FIG. 4d illustrates a graph of vertical motion of points (δy) versus vertical point position (y). The recovered model shown graphically in FIG. 4d has two parts a curved (parabolic) section 38a and a linear section 38b. The transition point between sections 38a and 38b corresponds to the bottom of upright surface 30. The transition point is also marked by a horizontal dotted line 36 shown in FIG. 4c. There are some points shown by triangles in the FIGS. 4b and 4c that were tracked but did not match the model, some tracked points which did match the model are shown by squares and some points that did not track well are shown as circles.

Figure 5:
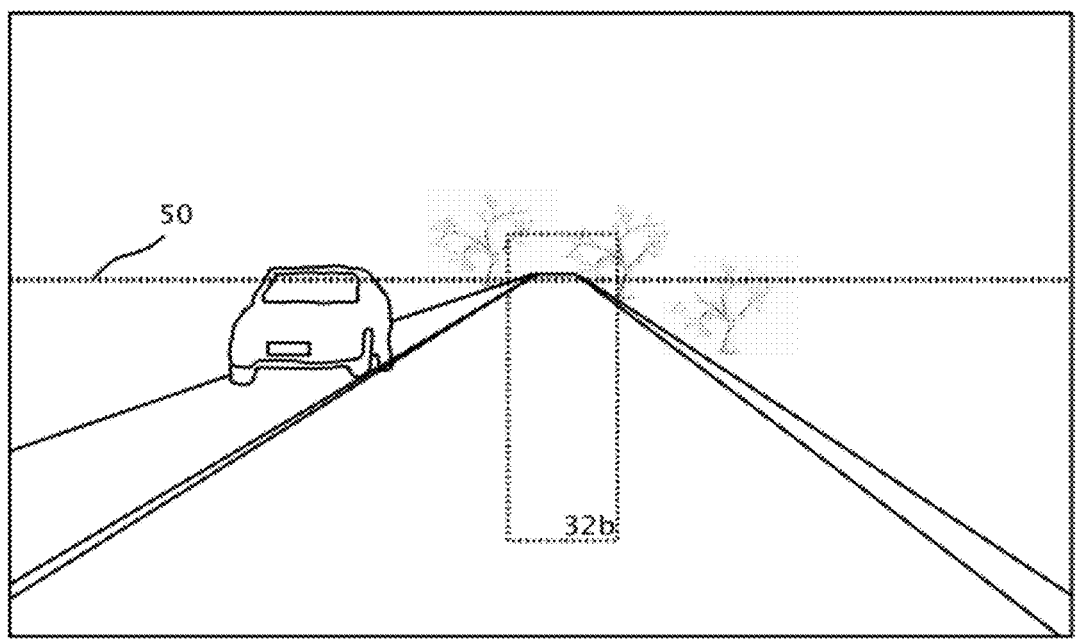
FIG. 5 illustrates another example of looming in an image frame, according to a feature of the present invention.

Reference is now made to FIG. 5 which illustrates another example of looming in an image frame 15. In image frame 15 of FIG. 5, there is no upright surface in patch 32b, only clear road ahead and the transition point between the two models is at the horizon marked by dotted line 50.

B estimation of the Motion Model and Time to Collision (TTC)

The estimation of the motion model and time to contact (TTC) (step 215) assumes we are provided a region 32, e.g. a rectangular region in image frame 15. Examples of rectangular regions are rectangles 32a and 32b shown in FIGS. 3 and 5 for example.

These rectangles may be selected based on detected objects such as pedestrians or based on the host vehicle 18 motion.

1. Tracking Points (step 211):

(a) A rectangular region 32 may be tessellated into 5×20 grid of sub-rectangles.

(b) For each sub-rectangle, an algorithm may be performed to find a corner of an image, for instance by using the method of Harris and Stephens and this point may be tracked. Using the best 5×5 Harris Point the eigenvalues of the matrix below may be considered, $$\begin{pmatrix} \sum \delta x^2 & \sum \delta x \delta y \\ \sum \delta x \delta y & \sum \delta y^2 \end{pmatrix} \quad (6)$$

and we look for two strong eigenvalues.

(c) Tracking may be performed by exhaustive search for the best some of squared differences (SSD) match in a rectangular search region of width W and height H. The exhaustive search at the start is important since it means that a prior motion is not introduced and the measurements from all the sub-rectangles are more statistically independent. The search is followed by fine tuning using an optical flow estimation using for instance the method Lukas Kanade. The Lukas Kanade method allows for sub-pixel motion.

2. Robust Model Fitting (step 213):

(a) Pick two or three points randomly from the 100 tracked points.

(b) The number of pairs ($N_{pairs}$) picked depends the vehicle speed (v) and is given for instance by:

$$N_{pairs} = \min(40, \max(5, 50-v)) \quad (7)$$

where v is in meter/second. The number of triplets ($N_{triplets}$) is given by:

$$N_{triplets} = 50 - N_{pairs} \quad (8)$$

(c) For two points, two models may be fit (step 213). One model assumes the points are on an upright object. The second model assumes they are both on the road.

(d) For three points two models may also be fit. One model assumes the top two points are on an upright object and the third (lowest) point is on the road. The second model assumes the upper point is on an upright object and the lower two are on the road.

Two models may be solved for three points by using two points to solve for the first model (equation 3) and then using the resulting $y_0$ and the third point to solve for the second model (equation 5).

(e) Each model in (d) gives a time-to-collision TTC value (step 215). Each model also gets a score based on how well the 98 other points fit the model. The score is given by the Sum of the Clipped Square of the Distance (SCSD) between the y motion of the point and predicted model motion. The SCSD value is converted into a probability like function:

$$\text{score} = \exp\frac{-SCSD}{N} \quad (9)$$

where is the number of points (N=98).

(f) Based on the TTC value, vehicle 18 speed and assuming the points are on stationary objects, the distance to the points:

Z=v×TTC may be computed. From the x image coordinate of each image point distance, the lateral position in world coordinates may be computed:

$$X = \frac{xZ}{f} \quad (10)$$

$$\Delta X = \frac{\delta x Z}{f} \quad (11)$$

(g) The lateral position at time TTC is computed thus. A binary Lateral Score requires that at least one of the points from the pair or triplet must be in the vehicle 18 path.

3. Multiframe. Scores: At each frame 15 new models may be generated, each with its associated TTC and score. The 200 best (highest scoring) models may be kept from the past 4 frames 15 where the scores are weighted:

$$\text{score}(n) = \alpha^n \text{score} \quad (12)$$

where n=0.3 is the age of the score and α=0:95.

4. FCW Decision: the actual FCW warning is given if any of the following three conditions occurs:

(a) The TTC for the model with the highest score is below the TTC threshold and the score is greater than 0.75 and $$\frac{\sum_{TTC<Threshold} \text{scores}}{\sum_{allmodels} \text{scores}} > 0.3 \quad (13)$$

(b) The TTC for the model with the highest score is below the TTC threshold and (c)

$$\frac{\sum_{TTC<Threshold} \text{scores}}{\sum_{allmodels} \text{scores}} > 0.5 \quad (14)$$

$$\frac{\sum_{TTC<Threshold} \text{scores}}{\sum_{allmodels} \text{scores}} > 0.75 \quad (15)$$

FIGS. 3 and 4 have shown how to robustly provide a FCW warning for points inside a given rectangle 32. How the rectangle is defined depends on the application as shown by other exemplary features of FIGS. 7a-7d and 8a, 8b.

FCW Trap for General Stationary Objects

Figure 6:
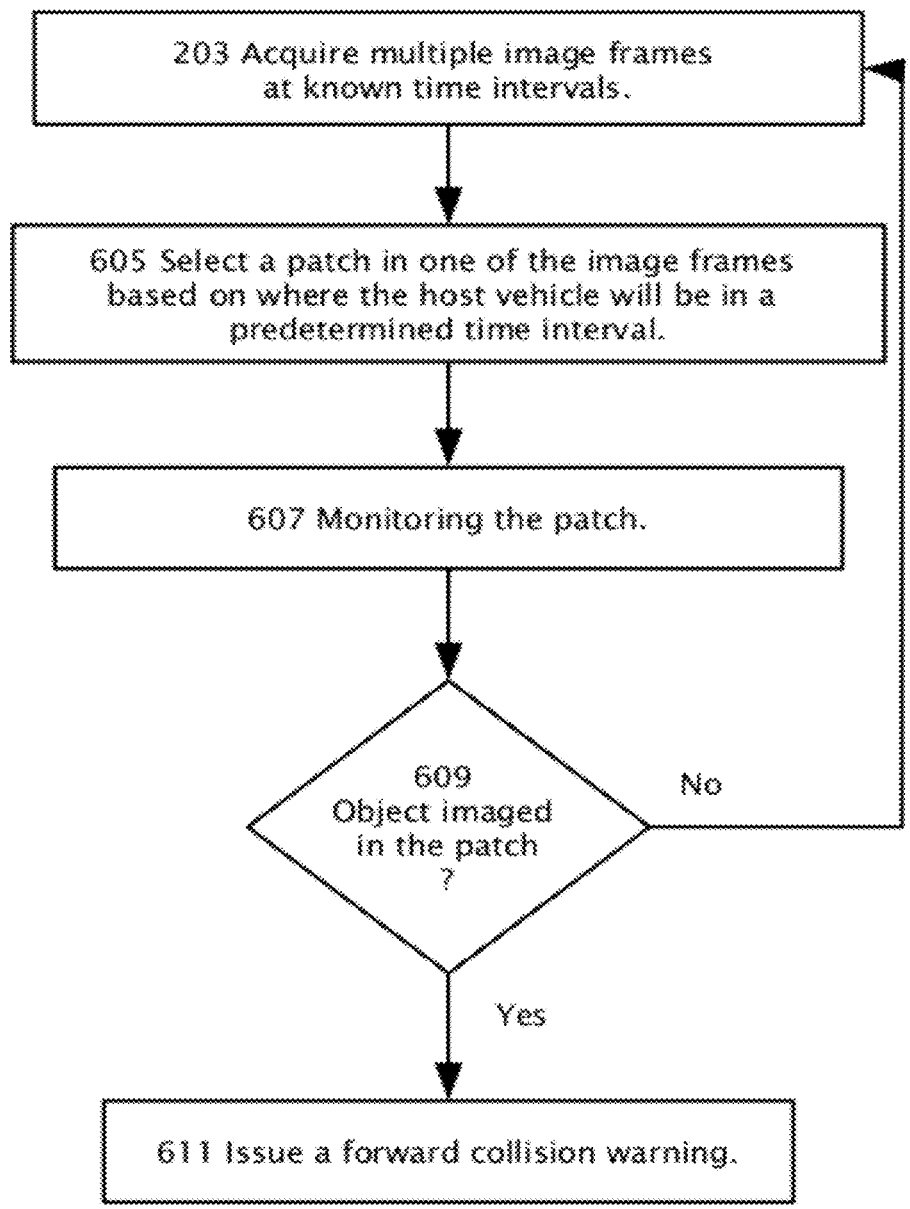
FIG. 6 shows a method for providing a forward collision warning trap, according to a feature of the present invention.

Reference is now made to FIG. 6 which shows a method 601 for providing a forward collision warning trap (FCWT) 601, according to a feature of the present invention. In step 203 multiple image frames 15 are acquired by camera 12. In step 605, patch 32 is selected in an image frame 15 which corresponds to where motor vehicle 18 will be in a predetermined time interval. Patch 32 is then monitored in step 607. In decision step 609 if a general object is imaged and detected in patch 32, a forward collision warning is issued in step 611. Otherwise capturing of images frames continues with step 203.

Figure 7A:
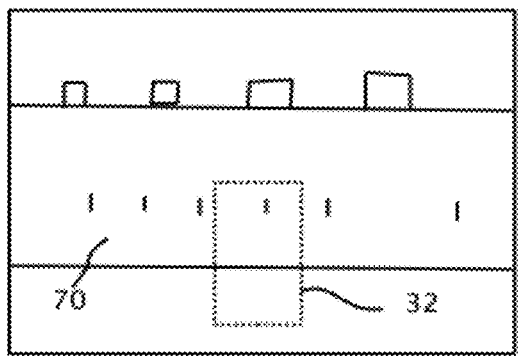
FIGS. 7a and 7b show examples of a forward collision trap warning being triggered on walls, according to an exemplary feature of the present invention.
Figure 7B:
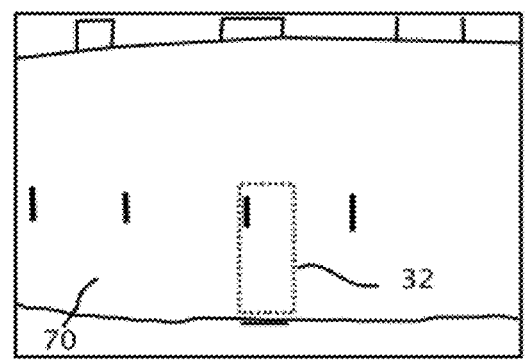
Figure 7C:
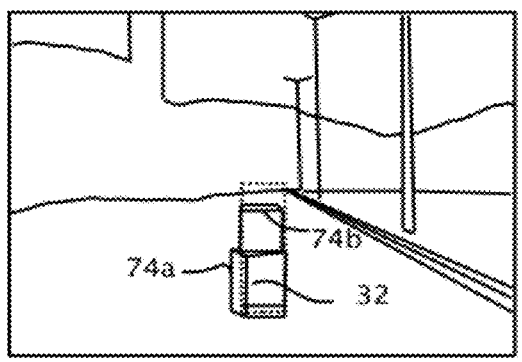
FIG. 7c shows an example of a forward collision trap warning being triggered on boxes, according to an exemplary feature of the present invention.
Figure 7D:
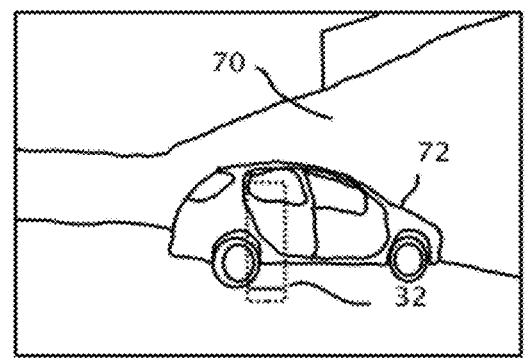
FIG. 7d shows an example of a forward collision trap warning being triggered on sides of a car, according to an exemplary feature of the present invention.

FIGS. 7a and 7b show examples of the FCWT 601 warning being triggered on walls 70, in FIG. 7d sides of a car 72 and in FIG. 7c on boxes 74a and 74b, according to an exemplary feature of the present invention. FIGS. 7a-7d are examples of general stationary objects which require no prior class based detection. The dotted rectangular region is defined as a target W=1 m wide at a distance where the host vehicle will be in t=4 seconds.

$$Z = vt \quad (16)$$

$$w = \frac{fW}{Z} \quad (17)$$

$$y = \frac{fH}{Z} \quad (18)$$

Where v is the vehicle 18 speed, H is the height of camera 12 and w and y are a rectangle width and vertical position in the image respectively. The rectangular region is an example of an FCW trap. If an object "falls" into this rectangular region, the FCW Trap may generate a warning if the TTC is less than a Threshold.

Improving Performance Using Multiple Traps:

In order to increase the detection rate, the FCW trap may be replicated into 5 regions with 50% overlap creating a total trap zone of 3 m width.

Dynamic position of the FCW trap may be selected (step 605) on yaw rate: the trap region 32 may be shifted laterally based on the vehicle 18 path determined from a yaw rate sensor, the vehicle 18 speed and dynamical model of the host vehicle 18.

FCW Trap for Validating Forward Collision Warning Signals

Special classes of objects such as vehicles and pedestrians can be detected in image 15 using pattern recognition techniques. According to the teachings of U.S. Pat. No. 7,113,867, these objects are then tracked over time and an FCW 22 signal can be generated using the change in scale. However, before giving a warning it is important to validate the FCW 22 signal using an independent technique. Validating the FCW 22 signal using an independent technique, for instance using method 209 (FIG. 2b) may be particularly important if system 16 will activate the brakes. In Radar/vision fusion systems the independent validation can come from the radar. In a vision only based system 16, the independent validation comes from an independent vision algorithm.

Object (e.g. pedestrian, lead vehicle) detection is not the issue. Very high detection rate can be achieved with a very low false rate. A feature of the present invention is to generate a reliable FCW signal without too many false alarms that will irritate the driver, or worse, cause the driver to brake unnecessarily. A possible problem with conventional pedestrian FCW systems is to avoid false forward collision warnings as the number of pedestrians in the scene is large but the number of true forward collision situations is very small. Even a 5% false rate would mean the driver would get frequent false alarms and probably never experience a true warning.

Pedestrian targets are particular challenging for FCW systems because the targets are non-rigid making tracking (according to the teachings of U.S. Pat. No. 7,113,867) difficult and scale change in particular is very noisy. Thus the robust model (method 209) may be used to validate the forward collision warning on pedestrians. The rectangular zone 32 may be determined by a pedestrian detection system 20. A FCW signal may be generated only if target tracking performed by FCW 22, according to U.S. Pat. No. 7,113,867 and the robust FCW (method 209) give a TTC smaller than one or more threshold values which may or may not be previously determined. Forward collision warning FCW 22, may have a different threshold value from the threshold used in the robust model (method 209).

One of the factors that can add to the number of false warning is that pedestrians typically appear in less structured roads where the drivers driving pattern can be quite erratic including sharp turns and lane changes. Thus some further constraints may need to be included on issuing a warning:

When a curb or lane mark is detected the FCW signal is inhibited if the pedestrian is on the far side of the curb or and lane and neither of the following conditions occur:

1. The pedestrian is crossing the lane mark or curb (or approaching very fast). For this it may be important to detect the pedestrian's feet.

2. The host vehicle 18 is not crossing the lane mark or curb (as detected by an LDW 21 system for example).

The drivers intentions are difficult to predict. If the driver is driving straight, has not activated turn signals and there are no lane markings predicting otherwise it is reasonable to assume that the driver will continue straight ahead. Thus, if there is a pedestrian in path and TTC is below threshold an FCW signal can be given. However if the driver is in a turn it is equally likely that he/she will continue in the turn or break out of the turn and straighten out. Thus, when yaw rate is detected, an FCW signal may only be given if the pedestrian is in path assuming the vehicle 18 will continue at the same yaw and also the pedestrian is in path if the vehicle straightens out.

The FCW trap 601 concept can be extended to objects consisting mainly of vertical (or horizontal lines). A possible problem with using the point based techniques on such objects is that the good Harris (corner) points are most often created by the vertical lines on the edge of the object intersecting horizontal lines on the distant background. The vertical motion of these points will be like the road surface in the distance.

Figures 8A, 8B:
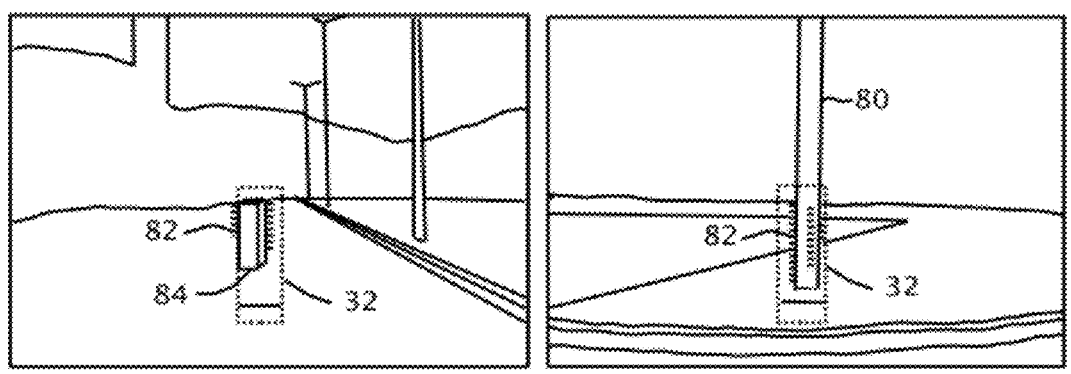
FIG. 8a shows an example of objects with strong vertical lines on a box, according to an aspect of the present invention.
FIG. 8b shows an example of objects with strong vertical lines on a lamp post, according to an aspect of the present invention.

FIGS. 8a and 8b show examples of objects with strong vertical lines 82 on a lamp post 80 in FIG. 8b and on a box 84 in FIG. 8a. Vertical lines 82 are detected in the trap zone 32. The detected lines 82 may be tracked between images. Robust estimation may be performed by pairing up lines 82 from frame to frame and computing a TTC model for each line pair, assuming a vertical object, and then giving a score based on the SCSD of the other lines 82. Since the number of lines may be small, often all combinatorially possibly line pairs are tested. Only line pairs where there is significant overlap are used. In the case of horizontal lines, triplets of lines are also giving two models as with points.

The indefinite articles "a", "an" is used herein, such as "an image", "a rectangular region" have the meaning of "one or more" that is "one or more images" or "one or more rectangular regions".

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

The invention claimed is:

1. A method for providing a forward collision warning or control signal using a camera mountable in a motor vehicle, the method comprising:
   acquiring a plurality of image frames at known time intervals;
   selecting a patch in at least one of the image frames;
   tracking optical flow between the image frames of a plurality of image points of said patch to produce a tracked optical flow;
   for a plurality of models selected from the group consisting of: (i) a road surface model wherein a portion of the image points is modeled to be imaged from a road surface (ii) vertical surface model wherein a portion of the image points is modeled to be imaged from a substantially vertical object and (iii) a mixed model wherein a first portion of the image points is modeled to be imaged from a road surface and a second portion of the image points is modeled to be imaged from a substantially vertical object, fitting the tracked optical flow of at least a portion of the image points to produce a plurality of fits to the models;
   using at least a portion of the image points, scoring the fits of the tracked optical flow to the respective models to produce respective scores; and
   determining if a collision is expected and a time-to-collision by selecting the model with a score which corresponds to a best fit of the image points to the tracked optical flow.

2. The method of claim 1, further comprising:
   determining that a collision is not expected based on the best fit of the image points to the tracked optical flow corresponding to the road surface model.

3. The method of claim 1, further comprising:
   determining that a collision is expected based on the best fit of the image points to the tracked optical flow corresponding to the vertical surface model or the mixed model.

4. The method of claim 3, further comprising:
   detecting in the patch a candidate image of a pedestrian; and
   verifying the candidate image as an image of an upright pedestrian and not an object in the road surface when the best fit model is the vertical surface model.

5. The method of claim 3, further comprising:
   detecting in the image frames a vertical line, wherein said patch is selected to include said vertical line;
   verifying the vertical line as an image of a vertical object and not of an object in the road surface when the best fit model is the vertical surface model.

6. The method of claim of claim 1, further comprising:
   issuing a warning based on said time-to-collision being less than a threshold.

7. A system comprising:
   a camera; and
   a processor mountable in a motor vehicle; wherein the system is configured to provide a forward collision warning or control signal,
   wherein the processor is configured to acquire a plurality of image frames at known time intervals;
   wherein the processor is configured to select a patch in at least one of the image frames;
   wherein the processor is configured to track optical flow between the image frames of a plurality of image points of said patch for a plurality of models selected from the group consisting of: (i) a road surface model wherein a portion of the image points is modeled to be imaged from a road surface (ii) vertical surface model wherein a portion of the image points is modeled to be imaged from a substantially vertical object and (iii) a mixed model wherein a first portion of the image points is modeled to be imaged from a road surface and a second portion of the image points is modeled to be imaged from a substantially vertical object;
   wherein the processor is configured to fit the tracked optical flow of at least a portion of the image points to produce a plurality of fits to the models;

wherein the processor is configured to use at least a portion of the image points and score the fits of the tracked optical flow to the respective models to produce respective scores; and wherein the processor is configured to use at least a portion of the image points, determine if a collision is expected and determine the time-to-collision by selecting the model with the score which corresponds to a best fit of the image points to the tracked optical flow.

8. The system of claim 7, wherein the processor is configured to fit the image points to a road surface model;

wherein the processor is configured to determine a collision is not expected based on the fit of the image points to the road surface model.

9. A method of providing a forward collision warning or control signal using a camera and a processor mountable in a motor vehicle, the method comprising:

acquiring a plurality of image frames at known time intervals;

selecting a patch in an image frame corresponding to where the motor vehicle will be in a predetermined time interval;

tracking optical flow between the image frames of a plurality of image points of said patch to produce a tracked optical flow;

for a plurality of models selected from the group consisting of: (i) a road surface model wherein a portion of the image points is modeled to be imaged from a road surface (ii) vertical surface model wherein a portion of the image points is modeled to be imaged from a substantially vertical object and (iii) a mixed model wherein a first portion of the image points is modeled to be imaged from a road surface and a second portion of the image points is modeled to be imaged from a substantially vertical object, fitting the tracked optical flow of at least a portion of the image points to produce a plurality of fits to the models;

using at least a portion of the image points, scoring the fits of the tracked optical flow to the respective models to produce respective scores; and determining if a collision is expected and a time-to-collision by selecting the model with a score which corresponds to a best fit of the image points to the tracked optical flow.

10. The method of claim of claim 9, further comprising:
determining if an object as imaged in said patch includes a substantially vertical portion.

11. The method of claim 9, further comprising:
fitting the image points to a road surface model; and
determining a collision is not expected based on the best fit of the image points to the road surface model.

12. The method of claim 9, further comprising:
issuing a forward collision warning when the best fit model is a vertical surface model or a mixed model.

13. A system for providing a forward collision warning or control signal in a motor vehicle, the system comprising:

a camera mountable in the motor vehicle, said camera operable to acquire a plurality of image frames at known time intervals;

a processor configured to select a patch in an image frame corresponding to where the motor vehicle will be in a predetermined time interval; wherein the processor is configured to track optical flow between the image frames of a plurality of image points of said patch to produce a tracked optical flow, for a plurality of models selected from the group consisting of: (i) a road surface model wherein a portion of the image points is modeled to be imaged from a road surface (ii) vertical surface model wherein a portion of the image points is modeled to be imaged from a substantially vertical object and (iii) a mixed model wherein a first portion of the image points is modeled to be imaged from a road surface and a second portion of the image points is modeled to be imaged from a substantially vertical object, wherein the processor is configured to fit the tracked optical flow of at least a portion of the image points to produce a plurality of fits to the models;

wherein the processor is configured to use at least a portion of the image points, to score the fits of the tracked optical flow to the respective models to produce respective score; and wherein the processor is configured to determine if a collision is expected and to determine a time-to-collision by selecting the model with a score which corresponds to a best fit of the image points to the tracked optical flow.

14. The system of claim 13, wherein the processor is further configured to determine if said object as imaged in said patch includes a substantially vertical portion
when the best fit of the image points to the tracked optical flow is of the vertical surface model or the mixed model.

15. The system of claim 13, wherein the processor is configured to issue a forward collision warning based on the TTC being less than a threshold.

16. The method of claim 9, further comprising:
inputting or computing from the image frames a yaw rate of the motor vehicle; and
dynamically shifting the patch laterally over the image frames based on the yaw rate of the motor vehicle.

17. The method of claim 4, further comprising:
verifying the candidate image as an object in the road surface and a collision is not expected when the best fit model is the road surface model.

* * * * *